United States Patent
McDaniel et al.

(10) Patent No.: US 6,850,462 B2
(45) Date of Patent: Feb. 1, 2005

(54) MEMORY CEMENT BOND LOGGING APPARATUS AND METHOD

(75) Inventors: Ronald E. McDaniel, Fort Worth, TX (US); Tony M. Small, Mansfield, TX (US); Dwight A. Bloomfield, Benbrook, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 345 days.

(21) Appl. No.: 10/079,626

(22) Filed: Feb. 19, 2002

(65) Prior Publication Data

US 2003/0156494 A1 Aug. 21, 2003

(51) Int. Cl.[7] ................................................ G01V 1/40
(52) U.S. Cl. ............................. 367/35; 181/105; 367/25
(58) Field of Search ............................. 367/25, 35, 27, 367/28, 33, 81; 181/105, 103; 702/6, 11, 12, 13; 166/253.1, 254.2, 255.1; 175/40; 324/303, 333

(56) References Cited

U.S. PATENT DOCUMENTS

| | | | |
|---|---|---|---|
| 3,291,247 A | | 12/1966 | Majani et al. ................. 181/5 |
| 3,401,773 A | | 9/1968 | Synnott, III. ................. 181/5 |
| 3,696,884 A | * | 10/1972 | Lafleur ......................... 367/28 |
| 3,729,705 A | * | 4/1973 | Grijalva ........................ 367/35 |
| 4,703,427 A | | 10/1987 | Catala et al. ............... 364/422 |
| 4,757,479 A | | 7/1988 | Masson et al. ............... 367/35 |
| 4,893,285 A | * | 1/1990 | Masson et al. ............... 367/35 |
| 5,058,078 A | * | 10/1991 | Eyl et al. ..................... 367/26 |
| 5,089,989 A | * | 2/1992 | Schmidt et al. ............... 367/35 |
| 5,377,160 A | * | 12/1994 | Tello et al. ................... 367/35 |
| 5,509,474 A | * | 4/1996 | Cooke, Jr. ................... 166/64 |
| 5,728,978 A | | 3/1998 | Roberts et al. ............. 181/102 |
| 5,907,131 A | * | 5/1999 | Tello ......................... 181/102 |
| 2001/0013412 A1 | * | 8/2001 | Tubel .................... 166/250.01 |
| 2003/0018433 A1 | * | 1/2003 | Blanch et al. ................. 702/6 |

* cited by examiner

*Primary Examiner*—Ian J. Lobo
(74) *Attorney, Agent, or Firm*—Charles D. Gunter, Jr.

(57) ABSTRACT

A method and device are shown for detecting the characteristics of a cement annulus between a casing in a borehole and the surrounding earth formations in a slickline cement bond logging operation. An acoustic logging tool is utilized which produces a pure signal downhole. The received acoustically transmitted energy produces electrical signals indicative of both the amplitude of the received energy and variable density log data. Both the amplitude data and the variable density log data are captured in memory downhole by the use of a time amplitude matrix which stores a limited number of data points for producing a cement bond log at the well surface.

17 Claims, 3 Drawing Sheets

MEMORY CEMENT BOND LOGGING APPARATUS AND METHOD

BACKGROUND OF THE INVENTION

1. Field of the Invention

The present invention generally relates to exploratory tools for use in oil and gas well bores and, more specifically, to acoustic logging devices and methods used to investigate the acoustic coupling between a well casing and a bore hole.

2. Description of the Prior Art

In a typical well completion operation, a casing for pipe is placed in the bore hole and cement is pumped into the annular region defined between the casing and the surrounding bore hole. For various reasons, the cement may fail to completely fill the annulus along the length of the casing resulting in the condition generally known as "channeling." Additionally, portions of the column of cement may fail to bond to the casing or formations. In such cases, fluids and/or gases from the formations at various depths may migrate along the imperfections in the column of cement. Fluid communication between adjacent porous zones is undesirable.

A number of systems are known in the prior art for obtaining a measure of the quality of a cement bond relative to the casing. For example, U.S. Pat. Nos. 3,291,274; 3,291,248; and 3,292,246 all utilize acoustic principles where an acoustic signal is transmitted between a transmitter and receiver. The amplitude of an early arrival signal at the receiver is measured as a determination of the quality of the bond of the cement to the casing (this early arrival usually is the casing signal since the acoustic energy under average conditions generally travels faster in the casing than in the surrounding cement or formation). If a good bond exists, the casing signal can be expected to be attenuated because of the energy dissipated from the casing to the cement and surrounding formations. On the other hand, if no bond or a relatively poor bond exists, the casing signal can be expected to be relatively unattenuated.

Other techniques are also known for determining the quality of cement in the annulus between the casing and formation. For example, in U.S. Pat. No. 3,401,773, the amplitude of a reverberated casing signal is captured and recorded and, additionally, the total energy of a selected later portion of the sonic signal is obtained by integration to provide a second indication of the quality of the cement bond.

The previously described devices supported the well logging tool on an electric line so that the information gathered down hole could be sent to the surface continuously. All of the information is sent up the electric line from the tool located down hole to surface equipment where the information is electronically removed from the line and analyzed in a method allowing the signals to be displayed in real time relating to a given depth in the bore hole.

It would be desirable to provide a method of running a cement bond log on a "slickline" (a supporting wire or cable with no electrical conductor). The absence of an electrical conductor, however, necessitates that data be gathered and stored in a memory module located in the tool itself. The data could be collected and stored while running the log and later downloaded and processed at the well surface. To this point, such a technique has proved to be impractical primarily due to the large volumes of memory storage required to store the data in question.

Another object of the present invention is to obtain such information using a slickline well apparatus.

The present invention has as an objective to provide new and improved devices and methods for determining, by acoustic velocity techniques, the quality of the cement behind a casing.

Another objective of the invention is to provide a device and method for determining the depth of a "stuck pipe" in a pipe recovery process in a well bore using a combination of slickline (memory logging) and improved sonic signal acoustic amplitude techniques.

SUMMARY OF THE INVENTION

A method is shown for detecting the characteristics of a cement annulus between a casing and the surrounding earth formations in a slickline cement bond logging operation. An acoustic logging tool is lowered within the bore hole to a desired depth. The acoustic logging tool has at least an acoustic transmitting transducer, a primary acoustic receiving transducer and a longitudinally spaced secondary acoustic receiving transducer. The acoustic logging tool is suspended within the bore hole by means of a slickline extending to the well surface.

A pulse of acoustic energy is generated from the transmitting transducer at a first point along a casing and the energy is transmitted along the casing. The acoustic energy so transmitted is received along the casing with the primary receiving transducer at a second point along the bore hole longitudinally spaced from the first point. An electrical signal is produced representative of the acoustic energy.

The acoustic energy continues to travel along the casing and is received with the secondary receiving transducer at a third point along the bore hole longitudinally spaced from the first and second points and providing an electrical signal representative thereof.

Data is collected based upon the electrical signals generated and the data so collected is stored in memory by the logging tool using a data compression scheme. Additional pulses of acoustic energy are generated at timed intervals as the acoustic logging tool is moved within the bore hole between known depths and the additional data is collected and stored in memory. The logging tool is retrieved to the well surface and a cement bond log is produced based upon the memorized data.

Preferably, a trigger pulse establishes the beginning of the acoustic signal which is transmitted, thereby establishing time intervals for use in later surface analysis. The time intervals comprise a first arrival, a recorded amplitude and a following acoustic wave train. The data which is collected and stored down hole allows both amplitude of the received energy and a variable density log to be produced later at the well surface to provide a complete cement bond log. The amplitude data is received by the primary acoustic receiving transducer and is representative of an amplitude characteristic of a preselected portion of each of said intercepted acoustic pulse occurring during a predetermined time interval at the second location following the first arrival of acoustic energy. The variable density log data is received by the secondary acoustic receiving transducer. Both the amplitude data and the variable density log data is captured in memory by the use of a time amplitude matrix which stores a limited number of data points for producing a cement bond log at the well surface. The matrix data is recovered at the well surface from the memory module and is provided to a surface interface computer for algorithmic reconstruction of the signal to provide variable density log data. The time and depth are continuously recorded up hole during the down hole logging operation and are later correlated to the amplitude and variable density log data gathered from the memory module.

Additional objectives come with features and advantages which will be apparent in the written description that follows.

DETAILED DESCRIPTION OF THE INVENTION

Figure 1:
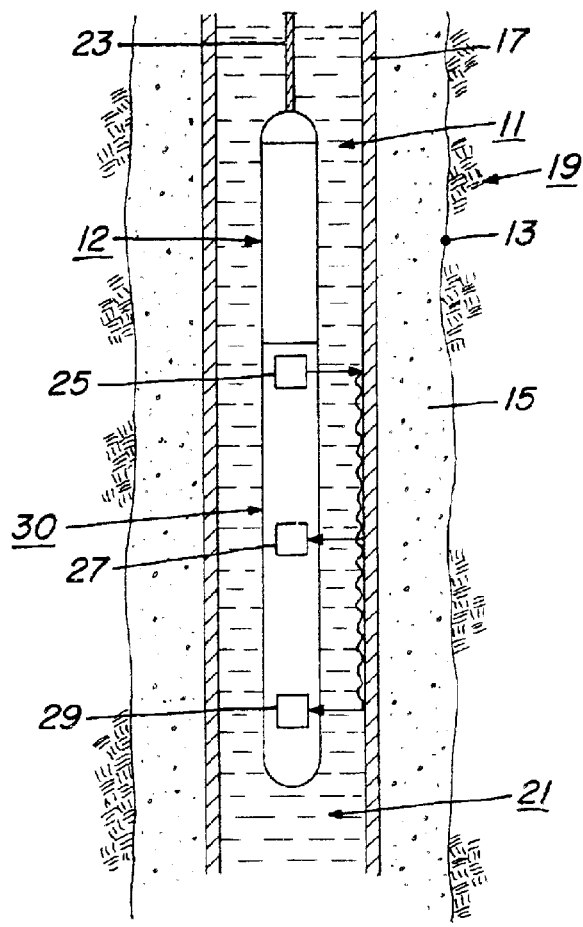
FIG. 1 is a schematic representation of the logging apparatus of the invention illustrating the logging tool in position in the bore hole.

FIG. 1 shows an acoustic logging tool 11 of the invention suspended within a bore hole 13 at a desired depth. As is customary in the art, a cement slurry 15 is pumped into the annular space between the well casing 17 and the surrounding subterranean formation 19. The cement 15 subsequently hardens to form a cement annulus between the casing and formation. In the illustration of FIG. 1, the cement region is seen to be completely bonded to the casing 17 and the surrounding formations 19. The casing interior 21 is filled with a fluid.

The logging tool 11 is of a generally cylindrical shape and is suspended within the casing 17 by means of a conventional slickline 23. By "slickline" is meant a line or cable with no electrical conductor. A suitable winch (not shown) is provided at the well surface for lowering and raising the tool 11 in the bore hole. The tool can be provided with centralizers (not shown) for maintaining it in a concentrically located position within the casing interior.

Mounted within the acoustic tool 11 are memory, battery, and electronic components located in an electronics section 12. An acoustic transmitting transducer 25, a primary acoustic receiving transducer 27, and a longitudinally spaced secondary acoustic receiving transducer 29 are located in an acoustic section 30. These units may be of conventional design and are commercially available in the marketplace from a number of sources. The transmitting transducer 25, typically a piezoelectric element, is capable if converting an electrical trigger pulse into a burst of acoustic energy. The receiving transducers 27, 29 are capable of converting an intercepted acoustic signal into a corresponding electrical waveform.

Figure 3:
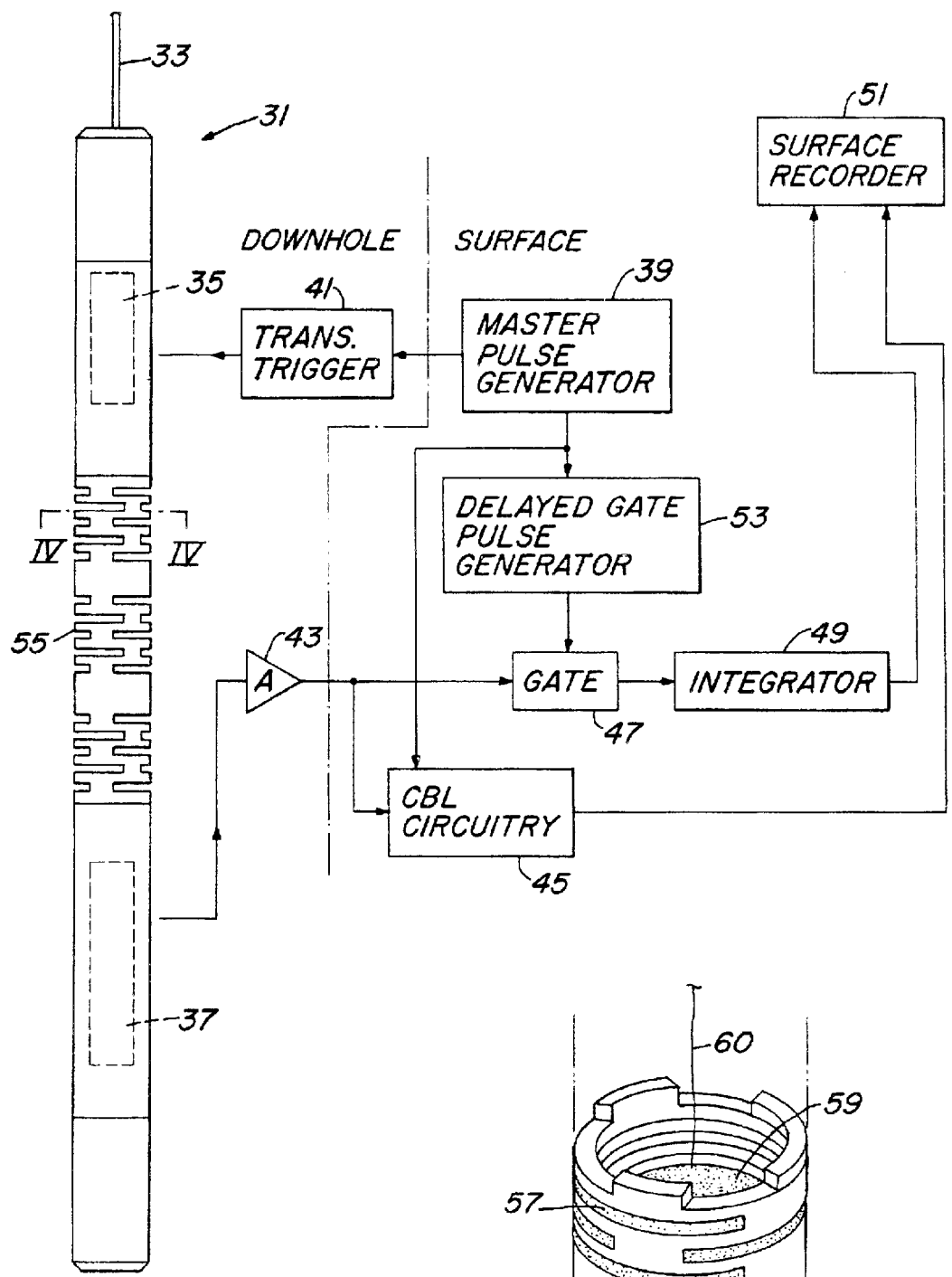
FIG. 3 is a prior art well logging device with the down hole and surface electronic circuitry shown in block fashion.

In order to explain the advantages of the device and method of the invention, reference will now be made to the prior art well logging device 31 shown in FIG. 3. The mechanics of generating and subsequently receiving a series of acoustic pulses can be typical of any number of prior designs. In other words, the mechanics of generating and receiving acoustic signals is generally the same with either wireline or slickline tools. Thus, the prior art device 31 illustrated in FIG. 3 is typical of the "wireline" logging devices in which the suspending cable 33 not only provides support for the tool, but also carries the electrical conductor for coupling electrical power and logging signals between the tool and well surface equipment. Mounted within the tool 31 in spaced relationship are an acoustic transmitting transducer 35 and a corresponding receiving transducer 37. To the light of the tool 31 is a block diagram of the downhole and surface electrical circuitry of the system. It will be understood that the downhole circuitry is mounted in the logging tool 31 and is connected via the electrical cable 33 to the surface equipment located above.

Although modern logging systems may utilize electronic circuitry of varying complexity, the basic principles of acoustic logging can be understood with reference to the device of FIG. 3. The electrical circuitry in this case includes a master pulse generator 39 which serves as a timing source for the entire system. The pulse generator 39 provides periodic output pulses to a transmitter triggering circuit 41 in the tool which serves to actuate the acoustic transmitter 35. The acoustic transmitter 35 emits periodic bursts of acoustic energy as the tool is moved through the well bore. The acoustic energy travels from the transmitter to the surrounding casing and down the casing back to the receiver 37.

Figure 2:
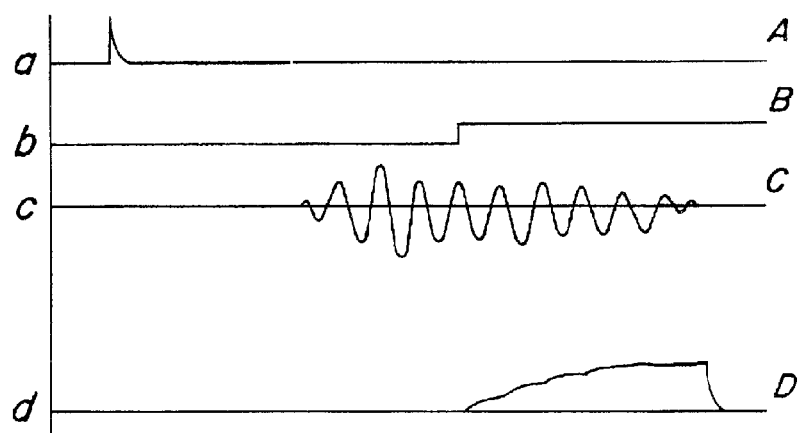
FIG. 2 is a wave form diagram produced by a prior art device which is useful in explaining the operation of the device of the invention.

The output of the acoustic receiver 37, in the form of an electrical signal, is fed through an amplifier 43 to the cement bond logging circuitry 45. Such circuitry is described, for example, in U.S. Pat. No. 3,401,773, issued Sep. 17, 1968. The output of the amplifier 43 is also coupled through a gate 47 to an integrating circuit 49. The output of the circuitry 45 and the integrator 49 are fed to a recorder 51 at the well surface which is driven synchronously with the movement of the logging tool through the bore hole, in known manner. The gate 47 can be actuated by a delayed gate pulse generator 53 of conventional design which, in turn, is synchronized with the master pulse generator 39. With reference to FIG. 2, the gate pulse output of the pulse generator 47 is indicated in curve B and is seen to start well after the initial arrival of the acoustic energy at the receiver 37. Thus, the initial portion of the received signal is not passed through the gate.

The portion of the received signal passed by the gate 47 is fed to the integrator 49 which produces an output indication corresponding to the total energy contained in the signal supplied to it. The line indicated at "A" in FIG. 2 is the master pulse, the line indicated at "B" is the gate pulse and the line indicated at line "C" is the received signal. The line indicated at "D" is the integrator output for the system. The output indications produced by the integrator 49 in FIG. 3 are simultaneously recorded with the output of the CBL circuitry 45 has a function of depth to provide a pair of correlations logs.

An acoustic transmitter and receiver arrangement of the type described can be used to provide information about the nature of the bond between the cement surrounding the casing and the casing which information is generally determined by the attenuation effects on the initial portion of the received signal. Since the casing provides a path of known, constant velocity for acoustic energy, it is possible to accurately select the desired portion of the received signal and examine its amplitude characteristics. Thus, if the cement is bonded to the casing in the area under investigation, the acoustic energy traveling along the casing will be greatly attenuated and this fact can be determined by examining the amplitude of the first significant amplitude excursion of the receiver's signal. On the other hand, if the cement is not bonded to the casing, the acoustic energy travels along the casing substantially without impediment and little attenuation results. In this case, the amplitude of the first arrival of the acoustics signal at the receiver is relatively high. It is therefore possible to distinguish between conditions of bonding and no bonding of cement to the casing as the tool moves through the bore hole.

Accurately indicating the presence or absence of a bond between cement and the casing along the bore hole is thus one important function of the logging operation. It is also desirable to distinguish between the mere absence of a bond and the absence of a cement behind the casing at the point of investigation. The initial portion of the received signal, which represents the direct compressional wave transmission along the casing, is affected only by materials tightly bonded to the casing and even a slight separation between the cement and casing will produce a "no bond" indication. It is known in the prior art that information concerning the presence or absence of cement behind the casing may be determined from the energy content of that portion of the signal received via the casing other than that representing direct compressional wave transmission along the casing. The later arrived portion of the received signal is affected by the presence and kind of material behind the casing, whether or not it is bonded to it. It is believed that this portion of the received casing signal is indicative of a vibration of the casing which couples energy into the surrounding materials. Thus, if cement is in contact with or near the casing, a relatively large amount of energy is coupled thereto and the energy in the casing is correspondingly reduced. Accordingly, the integrated output of the receiver signal would be relatively low. Conversely, if no cement is adjacent the casing, little energy is lost and a large integrator output is indicative of this fact.

The previously described prior art device is merely intended to provide a simplified explanation of the workings of a typical "wire line" device in which the information gathered downhole comes to the surface in timed increments. All of the information that is sent up the electric line is electronically removed and analyzed at the surface in a method which allows the signals to be displayed in real time relating to a given depth in the bore hole.

The present invention, on the other hand, concerns a tool which is run on a "slickline" (23 in FIG. 1) in which no electrical conductor is present to provide the collected data to the well surface as the tool is being run. It is thus necessary to gather data and store the data in a memory module in the tool itself. The data which is collected and stored can be processed later at the well surface. This has, in the past, been generally impractical due to the large volumes of data which must be stored to accomplish the task.

In the method of the present invention, the system collects data in such a way that the amount of memory necessary is reduced to a minimum. The inventive method involves the initiation of a trigger pulse and the recording of the data that allows both amplitude and variable density log (VDL) signals to be produced or reconstructed at the well surface. The amplitude can be derived in a conventional manner as described with respect to the previously described electric wire line method. The VDL however, is captured by the use of a time amplitude matrix which stores a limited number of points for production or reconstruction of the signals at the well surface.

In order to be able to store the data in memory in the form of a simple time amplitude matrix, it is necessary that a pure or substantially pure sonic signal be received by the downhole electronics. This substantially pure sonic signal is essentially free from all interactions in the tool which are difficult to define, isolate, and overcome. By providing a perfect sonic response in the tool, the data matrix can be recovered at the surface and processed with the VDL being produced by the algorithmic reconstruction of the signal in the surface interface computer. A conventional time/depth interface (included as a part of the system) records the depth and time information for correlation at the surface system. Once these two matrices are merged, the completion of a true cement bond log on the surface can be achieved in a shorter overall time, at less cost compared to conventional electric line units, and with quality which equals or exceeds the current technology.

The ability to provide a perfect sonic response in the acoustic logging tool is a critical point in practicing the method of invention. The pure sonic signal must be free from all interactions in the tool. The production of a pure signal allows the data which is collected to be contained in memory in a simple time amplitude matrix without distortion.

With reference to the prior art device of FIG. 3, the transmitter 35 generates acoustic signals which are to be detected by the receiving transducer 37. The desired detected signals are representative of the energy which passes from the transmitter 35 and through the casing to the receiver 37. For purposes of the present invention, it is critical that the detected signals not contain any spurious signal information, sometimes referred to as "tool noise" in the industry.

Ideally, the data collected by the receiver transducer will only include an accurate representation of the casing or borehole response to the signals generated from the transmitting transducer (25 in FIG. 1). However, it often occurs that signals obtained from conventional acoustic logging tools are subjected to various noises such as "tool noise" previously mentioned. Noise, in this context, will primarily mean energy traveling within or on the surface of the logging tool that is not representative of the casing/borehole response to the transmitted signals. Noise of this type may interfere with the ability of the detector transducer to provide an accurate representation of the earth/borehole response. This occurs when noise of sufficient amplitude is detected along with the borehole waves. Noise can be produced by any lasting waves traveling on the surface or within the body of the acoustic logging tool. For example, tool noise often occurs at frequencies close to the borehole signals and the noise also propagates with velocities close to the velocity of the borehole signals. Tool noise is thus coherent and not easily suppressed by conventional techniques.

If tool noise can be decoupled within the body of the logging tool to prevent propagation along the body of the tool, and if the acoustic signals can be detected so that they are not subject to amplitude and frequency distortion between the input signal and the output response signal, then composite signals can be obtained which would accurately reflect selected borehole propagation modes. The composite "pure" signals from the receiver stations could then be used for an accurate determination of the changes in phase and amplitude of the borehole response over time and distance, from which formation properties can be determined.

From the foregoing discussion, it is apparent that the acoustic transmitting transducers of the device of the invention should be ideally supported by a means which is incapable of passing detectable acoustic energy longitudinally between the spaced transducers at a velocity higher than that of the adjacent casing. Otherwise, the receiving circuits would be triggered prematurely by the acoustic energy traveling through the support means of the tool thereby preventing the time circuit from obtaining a time value accurately related to the velocity of the adjacent casing response, among other difficulties. Factors which affect the transmission of undesirable energy waves include the tool diameter, the borehole diameter, the materials from which the tool is manufactured, etc. Preferably, the tool includes either mechanical or electrical means for dampening the undesirable signals without affecting the borehole signals.

Figure 4:
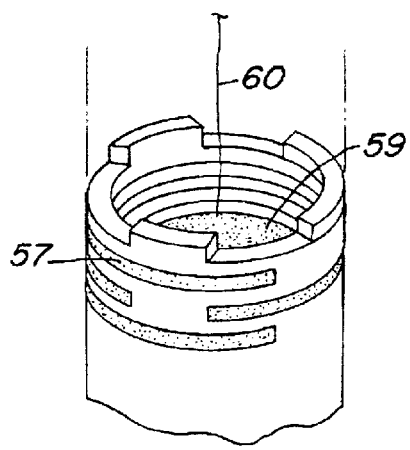
FIG. 4 is a sectional view taken along lines IV—IV in FIG. 3 illustrating modifications of the prior art device used to obtain a pure sonic signal in the method of the invention.

The prior art well logging tool 31 (FIG. 3) utilized a machined housing 55 which included a series of machined "cut-outs" which tended to interrupt the path of travel of the acoustic wave between the transmitter 35 and receiver 37. FIG. 4 illustrates a cross sectional view taken generally along lines IV—IV in FIG. 3 but modified to accommodate the purposes of the present invention. That portion 55 of the tool body illustrated in FIG. 3 utilizes a connecting or filling medium 57 both within the machine cut-outs and the interior region 59 of the device. The interior region 59 may also contain electrical wires or leads 60 which run between the transmitter and receiver. As seen in FIG. 4, the connecting medium 59 allows the tool wires 60 to "run dry" within the interior region 59. The gaps in the tool and the interior region are filled with a connecting medium which differs significantly in acoustic impedance from that of the material of the remaining portion of the tool housing. Example materials for use as the filler medium 57 include natural rubber, synthetic rubber, polymeric material, plastic, epoxy and materials denser than steel such as lead. The preferred filler medium is a resilient natural or synthetic polymeric material, such as heat and solvent resistant rubber. It will be understood by those skilled in the art that while, in the example, the mechanics of the tool body itself remove all feedback paths, electrical means could be utilized as well. In the preferred tool of the invention, all interference frequencies to the receiver are thus eliminated by mechanical and/or electrical means.

A commercially available tool capable of presenting sonically pure signals is presently available from Probe Technologies, Inc. of Fort Worth, Tex., as the 050-CB170-1000. A 1 11/16 inch diameter tool run within a 5 ½ inch casing has a transmitting transducer spaced approximately 36 inches from the primary receiver 37 and a secondary transducer 29 spaced approximately 24 inches below.

Returning to FIG. 1, the operation of the apparatus of the invention will now be described. The acoustic logging tool 11 is first lowered within the borehole to a desired depth by means of the slickline 23 extending to the well surface. A pulse of acoustic energy is generated from the transmitting transducer 25 at a first point along the casing 17 and the energy travels along the casing. The acoustic energy traveling along the casing is received by the primary receiving transducer 27 at a second point along the borehole longitudinally spaced from the first point and producing an electrical signal representative thereof. The first electrical signal is representative of the amplitude of the transmitted energy. As shown in FIG. 1, acoustic energy continues to be transmitted along the casing to the secondary receiving transducer 29 located at a third point longitudinally spaced along the borehole from the first and second points and produces an electrical signal at that point. Data is collected based upon the electrical signals and stored in memory carried downhole by the logging tool. Additional pulses of acoustic energy are generated at timed intervals as the acoustic logging tool is moved within the borehole between known depths with the data being stored in memory carried in the tool. The logging tool can then be retrieved to the well surface and a cement bond log can be produced based upon the memorized data.

In a preferred embodiment of the present invention, the trigger pulse to the transmitter establishes the beginning of the acoustic signal which is transmitted, thereby establishing timed intervals for use in later surface analysis. These timed intervals comprise a first arrival, a chosen amplitude and a following acoustic wave train. As previously explained, the amplitude data is collected by the primary acoustic receiving transducer 27 and is representative of an amplitude characteristic of a preselected portion of each of the intercepted acoustic pulses occurring during a predetermined time interval at the second locations following the first arrival of acoustic energy. The variable density log data is collected by the secondary acoustic receiving transducer 29. Both the amplitude data and the variable density log data is captured in memory by the use of a time amplitude matrix storing a limited number of data points for producing a cement bond log at the well surface. The matrix data is recovered at the well surface from the memory module and provided to a surface interface computer for algorithmic reconstruction of the signal to produce variable density log data. The time and depth are continuously recorded by the surface computer during the downhole logging operation and are later correlated to the amplitude and variable density log data gathered from the memory module.

The algorithmic reconstruction of the signal in the surface interface computer will now be described. The generalized data amplitude matrix contains time based data and signal amplitude data. A sample array can thus be constructed as:

$$\begin{bmatrix} t_0 D_1 D_2 D_3 & \cdots & D_k \\ t_1 D_1 D_2 D_3 & \cdots & D_k \\ \vdots & & \\ t_n D_1 D_2 D_3 & \cdots & D_k \end{bmatrix}$$

where each $t_n$ is a time based data sample and each $D_1$–$D_k$ is a sequence of amplitude measurements. Each $D_1$–$D_k$ in a row may be different values. Reference can be made through the time data $t_o \rightarrow t_n$ for each row constituting a unique set of amplitude data for a given measurement $[t_j, D_1, D_2, \ldots, D_k]$.

Figure 5:
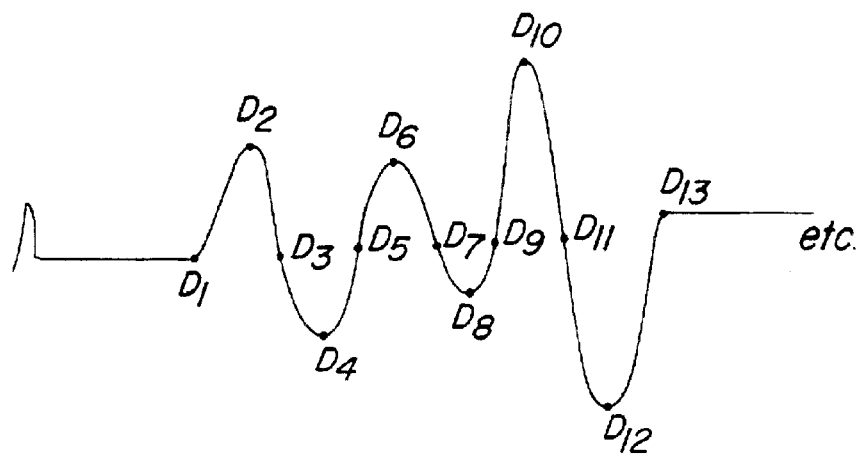
FIG. 5 is a graph of an amplitude curve showing the relevant data points thereon.

FIG. 5 of the drawings represents a simplified data set for one acoustic wave at $t_i$ for $D_1 \rightarrow D_{13}$. This Data Array (Matrix) will then be transformed at the surface into a depth matrix with necessary interpolation between $[t_j, D_1 \rightarrow D_k]$ $[t_{j+1i}, D_1 \rightarrow D_k]$ such that $t_j \rightarrow t_{i+1}$ converts to $d_{j+0} \rightarrow d_{j+9}$ on tenth of a foot boundarys with the appropriate transform described below:

$$\begin{bmatrix} t_i D_1 \rightarrow D_k \\ t_i D_1 \rightarrow D_k \end{bmatrix} \quad \begin{array}{c} \text{transform} \\ \rightarrow \end{array}$$

$$[\text{time} \rightarrow \text{data}] \quad \text{for each pair}$$

$$\text{of points}$$

$$\begin{bmatrix} d_i D_{01}^1 D_{02}^1, & \cdots & D_{0k}^1 \\ d_{i+1} D_{11}^1 D_{12}^1, & \cdots & D_{1k}^1 \\ d_{i+2} D_{21}^1 D_{22}^1, & \cdots & D_{2k}^1 \\ d_{i+9} D_{91}^1 D_{92}^1, & \cdots & D_{9k}^1 \end{bmatrix} = [\text{Depth} \rightarrow \text{Data}]$$

0.1 ft. sample space amplitude (typical)

Figure 6:
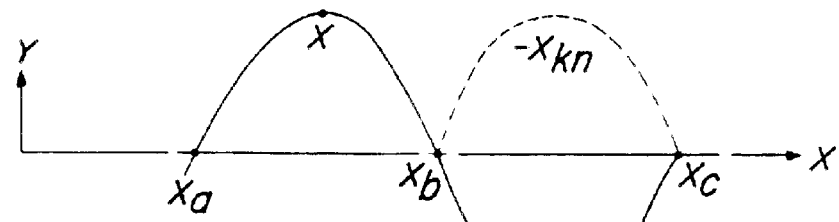
FIG. 6 is a graph of data points similar to FIG. 5 of a function showing data amplitude taken to a time base.

Now, with reference to FIG. 6 of the drawings, taking the end points as $X_a$ and $X_b$, it is necessary to provide a function which takes the data amplitudes to time base along the x-axis, such that:

$f(X_a) \rightarrow 0$ $f(X_b) \rightarrow 1$ assuming $X_b > X_a$ so $X_b$ does not equal $X_a$ we have the following function:

$$f(x) = y = \frac{1}{(x_b - x_a)} * X - \frac{x_a}{(x_b - x_a)}$$

set $x = x_a$; then $$y = \frac{1}{x_b - x_a} * x_a - \frac{x_a}{x_b - x_a} = \frac{x_a}{x_b - x_a} - \frac{x_a}{x_b - x_a} = 0$$

set $x = x_b$; then $$y = \frac{1}{x_b - x_a} * x_b - \frac{x_a}{x_b - xa} = \frac{x_b}{x_b - x_a} - \frac{x_a}{x_b - x_a} = \frac{x_b - x_a}{x_b - x_a} = 1$$

now any division between $X_a$ and $X_b$ can be mapped into $0 \leq X^1 \leq 1$.

If $X^1$ is multiplied by $\pi$ to get radians, then an approximating polynomial can be used to reconstruct the amplitude curve.

$$AMP = x - \frac{x^3}{3!} + \frac{x^5}{5!} - \frac{x^7}{7!} + \frac{x^9}{9!} + \text{Error term}$$

where the error after the $m^{th}$ term $= \sum_{k=m}^{\infty} \frac{(-1)^k x^{2k+1}}{(2k+1)!}$;

m=5 gives an error of 0.00692346 in the reconstructed waveform for the $X_b$ term when mapped into 1 and converted to $\pi$, the final amplitude is constructed by multiplying AMP*$X_n$ for each $X$ in the divided interval between $0 \leq X \leq \pi$ where $X = y * \pi$.

Figure 7:
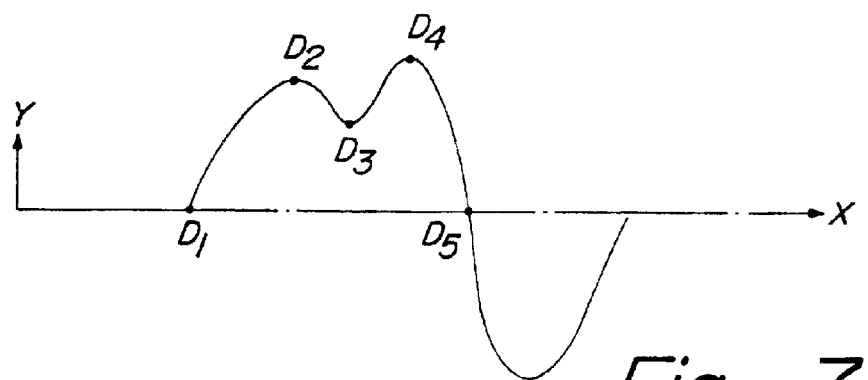
FIG. 7 is a graph of an amplitude curve similar to FIG. 5 but showing an imperfect sine wave.

Additional data in the amplitude matrix may be produced by non sinusoidal waves (see FIG. 7 of the drawings) which change direction above the base line but the frequency crossovers are not impacted. This change will produce a data matrix with additional samples per row as folllows:

[tp, $D_1$, $D_2$ - - - $D_k$, $D_{k+1}$, $D_{k+2}$, - - - $D_{k+j}$]

for a particular time based amplitude measurement at time $t_p$ and additional data j>2.

An invention has been provided with several advantages. The present device utilizes downhole memory carried in the logging tool itself and can be run on a slickline as opposed to a wire line. Many offshore rigs, in particular, are set up with permanent slickline arrangements which could easily utilize the present logging method. The present method utilizes a data compression scheme which collects the data in such a way that the amount of memory necessary is reduced to a minimum. Because a pure sonic signal is achieved, the present method allows the information collected to be contained in memory in a simple time amplitude matrix. This matrix, once recovered on the surface, can be processed and a variable density log constructed. The time/depth interface records the depth and time information for correlation in the surface system. Once the two matrices are merged, the completion of a true cement bond log can be completed in a much shorter time at a lower cost and with quality equaling or exceeding that of currently available technology.

While the invention has been shown in only one of its forms, it is not this limited but is susceptible to various changes and modifications without departing from the spirit thereof.

What is claimed is:

1. A method for detecting the characteristics of a cement annulus between a casing in a borehole and the surrounding earth formations in a slickline cement bond logging operation, the method comprising the steps of:

lowering an acoustic logging tool within the borehole to a desired depth, the acoustic logging tool having at least an acoustic transmitting transducer, a primary acoustic receiving transducer and a longitudinally spaced secondary acoustic receiving transducer, the acoustic logging tool being suspended within the borehole by means of a slickline extending to the well surface;

generating a pulse of acoustic energy from the transmitting transducer at a first point along said casing and transmitting said energy along said casing;

receiving the acoustic energy transmitted along the casing with the primary receiving transducer at a second point along the borehole longitudinally spaced from the first point and producing an electrical signal representative thereof;

receiving the acoustic energy transmitted along the casing with the secondary receiving transducer at a third point along the borehole longitudinally spaced from the first and second points and producing an electrical signal representative thereof;

collecting amplitude and variable density data based upon the electrical signals and storing the data so collected in memory in a time amplitude matrix, the memory carried down hole by the logging tool;

generating additional pulses of acoustic energy at timed intervals as the acoustic logging tool is moved within the borehole between known depths and storing the data collected in memory;

retrieving the logging tool to the well surface and producing a cement bond log based upon the memorized data.

2. The method of claim 1, wherein the data which is collected downhole is stored in memory carried in the tool using a data compression scheme.

3. The method of claim 1, wherein a trigger pulse establishes the beginning of the acoustic signal which is transmitted, thereby establishing time intervals for use in later surface analysis, the time intervals comprising a first arrival, a chosen amplitude and a following acoustic wave train.

4. The method of claim 3, wherein data is collected and stored down hole that allows both amplitude of the received energy and variable density log data to be produced later at the well surface to provide a cement bond log.

5. The method of claim 4, wherein the amplitude data is collected and stored from the primary acoustic receiving transducer and is representative of an amplitude characteristic of a preselected portion of each of said intercepted acoustic pulses occurring during a predetermined time interval at the second location following the first arrival of acoustic energy.

6. The method of claim 5, wherein the variable density log data is collected by the secondary acoustic receiving transducer.

7. The method of claim 6, wherein both the amplitude data and the variable density log data are captured in memory by the use of a time amplitude matrix which stores a limited number of data points for producing a cement bond log at the well surface.

8. The method of claim 7, wherein the matrix data is recovered at the well surface from the memory module and provided to a surface interface computer for algorithmic reconstruction of the signal to provide variable density log data.

9. The method of claim 8, wherein time and depth are continuously recorded during the down hole logging operation and are later correlated to the amplitude and variable density log data gathered from the memory module.

10. The method of claim 1, wherein the data is stored in the time amplitude matrix in a sequence corresponding to an order of measurement to facilitate algorthimic reconstruction of the data to produce the cement bond log.

11. A method for detecting the characteristics of a cement annulus between a casing in a borehole and the surrounding earth formations in a slickline cement bond logging operation, the method comprising the steps of:

lowering an acoustic logging tool within the borehole to a desired depth, the acoustic logging tool having at least an acoustic transmitting transducer, a primary acoustic receiving transducer and a longitudinally spaced secondary acoustic receiving transducer, the acoustic logging tool being suspended within the borehole by means of a slickline extending to the well surface;

generating a pulse of acoustic energy from the transmitting transducer at a first point along said casing and transmitting said energy along said casing;

receiving the acoustic energy transmitted along the casing with the primary receiving transducer at a second point along the borehole longitudinally spaced from the first point and producing an electrical signal representative thereof;

receiving the acoustic energy transmitted along the casing with the secondary receiving transducer at a third point along the borehole longitudinally space from the first and second points and producing an electrical signal representative thereof;

collecting amplitude and variable density data based upon the electrical signal and storing the data so collected in memory in a time amplitude matrix, the memory carried hole by the logging tool;

generating additional pulses of acoustic energy at timed intervals as the acoustic logging tool is moved within the borehole between known depths and storing the additional data collected in memory;

retrieving the logging tool to the well surface and producing a cement bond log based upon the memorized data; and wherein each pulse of acoustic energy so generated down hole is a nearly pure sonic signal free from interactions with the logging tool itself.

12. The method of claim 11, wherein a trigger pulse establishes the beginning of the acoustic signal which is transmitted by the transmitting transducer, thereby establishing time intervals for use in later surface analysis, the time intervals comprising a first arrival, a chosen amplitude and a following acoustic wave train; and wherein data is collected and stored down hole using a data compression technique that allows both an amplitude of the received signals and variable density log data to be produced later at the well surface.

13. The method of claim 12, wherein both the amplitude data and the variable density log data are captured in memory by the use of a time amplitude matrix which stores a limited number of data points for reconstruction at the well surface.

14. The method of claim 11, wherein the acoustic logging tool uses mechanical dampening to achieve a nearly pure sonic signal free from interactions with the logging tool itself.

15. The method of claim 14, wherein the mechanical dampening is achieved by providing a synthetic dampening material within an interior space of the logging tool as well as within cut-out regions on the exterior of the tool.

16. The method of claim 15, wherein the synthetic dampening material which is present within the interior space of the logging tool also serves to isolate any electrical wires running through the interior space so that the electrical wires are run dry within the acoustic tool body.

17. The method of claim 11, wherein the data is stored in the time amplitude matrix in a sequence corresponding to an order of measurement to facilitate algorthimic reconstruction of the data to produce the cement bond log.

\* \* \* \* \*